United States Patent
Wang et al.

(10) Patent No.: US 9,986,494 B2
(45) Date of Patent: May 29, 2018

(54) SMALL CELL DISCOVERY METHOD AND SYSTEM, BASE STATION, AND USER EQUIPMENT, AND COMMUNICATION APPARATUS

(71) Applicant: China Mobile Communications Corporation, Beijing (CN)

(72) Inventors: Fei Wang, Beijing (CN); Jianjun Liu, Beijing (CN); Yi Zheng, Beijing (CN); Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days. days.

(21) Appl. No.: 15/125,753

(22) PCT Filed: Jun. 3, 2015

(86) PCT No.: PCT/CN2015/080618
§ 371 (c)(1),
(2) Date: Sep. 13, 2016

(87) PCT Pub. No.: WO2015/188711
PCT Pub. Date: Dec. 17, 2015

(65) Prior Publication Data
US 2017/0006532 A1  Jan. 5, 2017

(30) Foreign Application Priority Data
Jun. 9, 2014 (CN) .......................... 2014 1 0253896

(51) Int. Cl.
*H04W 48/16* (2009.01)
*H04L 5/00* (2006.01)
(Continued)

(52) U.S. Cl.
CPC ............. *H04W 48/16* (2013.01); *H04L 5/006* (2013.01); *H04L 5/0048* (2013.01);
(Continued)

(58) Field of Classification Search
CPC ............. H04W 52/0206; H04W 36/08; H04W 84/045; H04W 8/005; H04W 56/001;
(Continued)

(56) References Cited

U.S. PATENT DOCUMENTS

2012/0196617 A1* 8/2012 Sun .................... H04W 36/0061
455/456.1
2013/0040640 A1* 2/2013 Chen ...................... H04W 36/30
455/434
(Continued)

FOREIGN PATENT DOCUMENTS

CN 103327543 A 9/2013
CN 103716858 A 4/2014
(Continued)

OTHER PUBLICATIONS

International Search Report for International Application No. PCT/CN2015/080618 with English translation, dated Sep. 2, 2015, 4 pages.
(Continued)

*Primary Examiner* — Daniel Lai
(74) *Attorney, Agent, or Firm* — Arch & Lake LLP

(57) ABSTRACT

Disclosed is a small cell discovery method, the method including: a base station of the current service cell receives a physical cell identifier and a status parameter transmitted by a base station of a non-service cell adjacent to the current service cell, the status parameter being used to indicate a mode of transmitting an air interface signal by the base station of the non-service cell; the base station of the current service cell transmits the physical cell identifier and the status parameter to a user equipment. Also, disclosed are a base station, a user equipment and a small cell discovery system.

17 Claims, 10 Drawing Sheets

(51) Int. Cl.
  *H04W 72/08* (2009.01)
  *H04W 88/02* (2009.01)
  *H04W 88/08* (2009.01)
  *H04W 92/10* (2009.01)
  *H04W 84/04* (2009.01)

(52) U.S. Cl.
  CPC ........ *H04W 72/085* (2013.01); *H04W 84/045* (2013.01); *H04W 88/02* (2013.01); *H04W 88/08* (2013.01); *H04W 92/10* (2013.01)

(58) Field of Classification Search
  CPC . H04W 48/12; H04W 36/0061; H04W 88/08; H04W 72/04; H04W 72/042; H04W 24/02; H04W 48/20; H04W 36/0083; H04W 52/0216; H04W 36/0055; H04W 72/085; H04W 72/12; H04W 36/30; H04W 40/246; H04W 52/0274; H04W 68/02; H04W 48/16; H04W 92/10; H04W 88/02; H04L 5/006; H04L 5/0048
  See application file for complete search history.

(56) References Cited

U.S. PATENT DOCUMENTS

| | | | |
|---|---|---|---|
| 2013/0077507 A1 | 3/2013 | Yu | |
| 2014/0171073 A1* | 6/2014 | Kim | H04W 24/10 455/434 |
| 2015/0031368 A1 | 1/2015 | Zhong | |
| 2015/0126206 A1* | 5/2015 | Krishnamurthy | H04W 56/00 455/452.1 |
| 2015/0271738 A1* | 9/2015 | Cheng | H04W 16/24 455/422.1 |
| 2016/0021602 A1* | 1/2016 | Li | H04W 24/10 370/254 |

FOREIGN PATENT DOCUMENTS

| | | |
|---|---|---|
| CN | 103843288 A | 6/2014 |
| EP | 2416609 A1 | 2/2012 |
| WO | 2013140491 A1 | 9/2013 |

OTHER PUBLICATIONS

Samsung, "Discussion on small cell on/off scenarios and procedures," R1-141287, 3GPP TSG-RAN WG1#76bis, Shenzhen, China, Mar. 31-Apr. 4, 2014, 13 pages.

NTT Docomo ,"Views on discovery signal-based RRM measurement procedures," R1-142260, 3GPP TSG RAN WG1 Meeting #77, Seoul, Korea, May 19-23, 2014, 6 pages.

Huawei, "RAN3 Consideration for Small cell on/off and discovery," R3-141048, 3GPP TSG-RAN3 Meeting #84, Seoul, Korea, May 19-23, 2014, 3 pages.

Extended European Search Report in connection with corresponding EP Application No. EP, 15807388, dated Nov. 7, 2017, 9 pages.

CN Office Action dated Jan. 31, 2018 for CN App. No. 201410253896.4. 19 pages.

* cited by examiner a base station of a current servicing small cell receives a physical cell identifier and a status parameter sent by a base station of a non-servicing small cell neighboring the current servicing small cell — 101 the base station of the current servicing small cell sends the physical cell identifier and the status parameter to a user equipment — 102

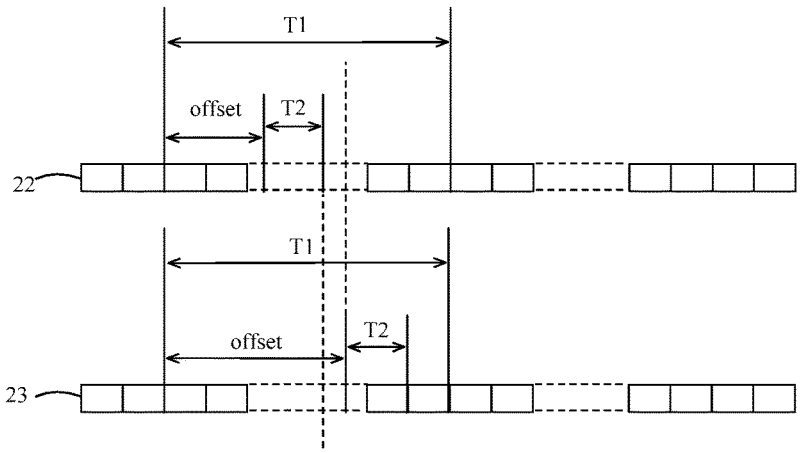

FIG. 1-5

```
┌─────────────────────────────────────────────────┐
│ a base station of a current servicing small cell receives a    │ 201
│ physical cell identifier and a status parameter sent by base   │
│ station of a non-servicing small cell neighboring the current  │
│                 servicing small cell                            │
└─────────────────────────────────────────────────┘
                          │
┌─────────────────────────────────────────────────┐
│  the base station of the current servicing small cell sends the │ 202
│    physical cell identifier and the status parameter to a user  │
│                         equipment                                │
└─────────────────────────────────────────────────┘
                          │
┌─────────────────────────────────────────────────┐
│   the base station of the current servicing small cell receives a │ 203
│  physical cell identifier and a reference signal received power of │
│  a non-servicing small cell satisfying a predetermined condition   │
│                    sent by the user equipment,                      │
└─────────────────────────────────────────────────┘
                          │
┌─────────────────────────────────────────────────┐
│  the base station of the current servicing small cell determines │ 204
│     the non-servicing small cell to be awaken, based on the      │
│ reference signal received power of the non-servicing small cell  │
│             satisfying the predetermined condition                │
└─────────────────────────────────────────────────┘
                          │
┌─────────────────────────────────────────────────┐
│   the base station of the current servicing small cell hands the │
│  user equipment over to the awaken non-servicing small cell      │ 205
└─────────────────────────────────────────────────┘
```

FIG. 2

SMALL CELL DISCOVERY METHOD AND SYSTEM, BASE STATION, AND USER EQUIPMENT, AND COMMUNICATION APPARATUS

CROSS-REFERENCE TO RELATED APPLICATION

The present application is the U.S. national phase of PCT Application No. PCT/CN2015/080618 filed on Jun. 3, 2015, which claims the priority of a Chinese patent application No. 201410253896.4 filed in China on Jun. 9, 2014, both disclosures of which are incorporated in their entirety by reference herein.

TECHNICAL FIELD

The present disclosure relates to the long term evolution (LTE) technique, and in particular to a small cell discovery method and system, a base station, a user equipment, and a communication apparatus.

BACKGROUND

Currently, a dense deployment scenario for small cells in the LTE is an important scenario focused by standardization. In this scenario, a plurality of small cells operate in the same frequencies, their coverage areas overlap with each other, and significant interference may e generated among them when they are switched on simultaneously. However, such interference among the small cells may be reduced by using a semi-static or dynamic small cell on/off mechanism which may also save a power consumption of a base station.

In current standards, one small cell in an off state will not send an air-interface signal. Thus, a user equipment cannot detect synchronization signals from the small cell, nor can it measure information such as a reference signal received power (RSRP) of the small cell. If the UE discovers a signal quality of one small cell in the off state becomes better than that of the serving small cell, apparently, the UE should access the small cell in the off state. However, it is a problem to be solved that how the UE discovers the small cell in the off state.

SUMMARY

In view of this, embodiments of the present disclosure provide a small cell discovery method and system, a base station, a user equipment and a communication apparatus, which can enable the user equipment to discover a small cell in an off state instantly.

Technical solutions of the embodiments of the present disclosure are implemented as follow.

In a first aspect, the embodiments of the present disclosure provide a small cell discovery method, which includes: receiving, by a base station of a current servicing small cell, a physical cell identifier and a status parameter sent by a base station of a non-servicing small cell neighboring the current servicing small cell, the status parameter being to indicate a mode in which the base station of the non-servicing small cell sends air-interface signals; and sending, by the base station of the current servicing small cell, the physical cell identifier and the status parameter to a user equipment (UE).

Optionally, the method further includes: receiving, by the base station of the current servicing small cell, a physical cell identifier and a reference signal received power (RSRP) of one non-servicing small cell satisfying a predetermined condition sent by the UE; determining, by the base station of the current servicing small cell based on the RSRP of the non-servicing small cell satisfying the predetermined condition, the non-servicing small cell to be awaken; and handing, by the base station of the current servicing small cell, the UE over to the awaken non-servicing small cell.

Optionally, the status parameter includes a period T1 at which the base station of the non-servicing small cell sends air-interface signals, a duration T2 in which the base station of the non-servicing small cell sends the air-interface signals, an offset time of the non-servicing small cell, and a value X obtained after performing a remainder operation to the period T1 using a system frame number SFN.

In a second aspect, the embodiments of the present disclosure provide a small cell discovery method, which includes: receiving, by a UE, a physical cell identifier and a status parameter of a base station of a non-servicing small cell sent by a base station of a current servicing small cell, the status parameter being to indicate a mode in which the base station of the non-servicing small cell sends air-interface signals; determining time information according to which the base station of the non-servicing small cell sends the air-interface signals, by the UE according to obtained air-interface timing, the physical cell identifier and the status parameter; and detecting, by the UE based on the time information, the air-interface signals sent by the base station of the non-servicing small cell, to discover the non-servicing small cells.

Optionally, the method further includes: measuring the RSRP of the non-servicing small cell by the UE; determining, by the UE based on the RSRP and a predetermined condition, a non-servicing small cell satisfying the predetermined condition; and sending, by the UE, a physical cell identifier and a RSRP of the non-servicing small cell satisfying the predetermined condition to the base station of the current servicing small cell.

Optionally, the step of determining, by the UE based on the RSRP and the predetermined condition, the non-servicing small cell satisfying the predetermined condition includes: judging, by the UE, whether the RSRP is larger than a predetermined first threshold; and when the RSRP is larger than the first threshold, determining a non-servicing small cell having the RSRP larger than the first threshold as the non-servicing small cell satisfying the predetermined condition.

Optionally, the step of determining, by the UE based on the RSRP and the predetermined condition, the non-servicing small cell satisfying the predetermined condition includes: determining a non-servicing small cell having a RSRP satisfying $RSRP_{dormant} - RSRP_{serving} > RSRP_{threshold}$ as the non-servicing small cell satisfying the predetermined condition, where $RSRP_{dormant}$ is a measured strength value of the RSRP of the non-servicing small cell $RSRP_{serving}$ is a measured strength value of the RSRP of the current servicing small cell, and $RSRP_{threshold}$ is a second threshold.

Optionally, the air-interface signals at least include one of the following signals: a primary synchronization signal, a secondary synchronization signal, a common reference signal, and a channel state information reference signal.

In a third aspect, the embodiments of the present disclosure provide a base station including a first receiving unit and a first sending unit. The first receiving unit is to receive a physical cell identifier and a status parameter sent by a base station of a non-servicing small cell neighboring a current servicing small cell, the status parameter being to indicate a mode in which the base station of the non-servicing small cell sends air-interface signals; and the first sending unit is to send the physical cell identifier and the status parameter to a UE.

Optionally, the base station further includes a second receiving unit, a determination unit, and a handover unit. The second receiving unit is to receive a physical cell identifier and a RSRP of a non-servicing small cell satisfying a predetermined condition sent by the UE; the first determination unit is to determine the non-servicing small cell to be awaken, based on the RSRP of the non-servicing small cell satisfying the predetermined condition; and the handover unit is to hand the UE over to the awaken non-servicing small cell.

Optionally, the status parameter includes a period T1 at which the base station of the non-servicing small cell sends air-interface signals, a duration T2 in which the base station of the non-servicing small cell sends the air-interface signals, an offset time of the non-servicing small cell, and a value X obtained after performing a remainder operation to the period T1 using a SFN.

In a fourth aspect, the embodiments of the present disclosure provide a user equipment including a third receiving unit, a second determination unit, and a detection unit. The third receiving unit is configured to receive a physical cell identifier and a status parameter of a base station of a non-servicing small cell, sent by a base station of a current servicing small cell. The status parameter is to indicate a mode in which the base station of the non-servicing small cell sends air-interface signals. The second determination unit is configured to determine time information according to which the base station of the non-servicing small cell sends the air-interface signals, based on obtained air-interface timing, the physical cell identifier and the status parameter. The detection unit is configured to detect the air-interface signals sent by the base station of the non-servicing small cell based on the time information, to discover the non-servicing small cell.

Optionally, the user equipment further includes a measurement unit, a third determination unit, a third sending unit. The measuring unit is configured to measure the RSRPs of the non-servicing small cell; the third determination unit is configured to determine a non-servicing small cell satisfying a predetermined condition, based on the RSRP and the predetermined condition; and the third sending unit is configured to send a physical cell identifier and a RSRP of the non-servicing small cell satisfying the predetermined condition to the base station of the current servicing small cell.

Optionally, the third determination unit includes a judgment module and a determination module. The judgment module is configured to judge whether RSRP is larger than a predetermined first threshold; the determination module is configured to, when the RSRP is larger than the first threshold, determine a non-servicing small cell having the RSRP larger than the first threshold as the non-servicing small cell satisfying the predetermined condition.

Optionally, the third determination unit is configured to determine a non-servicing small cell having a RSRP satisfying $RSRP_{dormant} - RSRP_{serving} > RSRP_{threshold}$ as the non-servicing small cell satisfying the predetermined condition, where $RSRP_{dormant}$ is a measured strength value of the RSRP of the non-servicing small cell, $RSRP_{serving}$ is a measured strength value of the RSRP of the current servicing small cell, and $RSRP_{threshold}$ is a second threshold.

Optionally, the air-interface signals at least include one of the following signals: a primary synchronization signal, a secondary synchronization signal, a common reference signal, and a channel state information reference signal.

In a fifth aspect, the embodiments of the present disclosure provide a small cell discovery method, which includes: receiving, by a base station of a current servicing small cell, a physical cell identifier and a status parameter sent by a base station of a non-servicing small cell neighboring a current servicing small cell, the status parameter being to indicate a mode in which the base station of the non-servicing small cell sends air-interface signals; and sending, by the base station of the current servicing small cell, the physical cell identifier and the status parameter to a UE; receiving, by the UE, the physical cell identifier and the status parameter sent by the base station of the current servicing small cell, of the base station of the non-servicing small cell, the status parameter being used to indicate a mode in which the base station of the non-servicing small cell sends air-interface signals; determining time information at which the base station of the non-servicing small cell sends the air-interface signals, by the UE according to obtained air-interface timing, the physical cell identifier and the status parameter; and detecting, by the UE based on the time information, the air-interface signals sent by the base station of the non-servicing small cell, to discover the non-servicing small cell.

In a sixth aspect, the embodiments of the present disclosure provide a small cell discovery system, which includes a base station and a user equipment. The base station is configured to receive a physical cell identifier and a status parameter sent by a base station of a non-servicing small cell neighboring a current servicing small cell, the status parameter being to indicate a mode in which the base station of the non-servicing small cell sends air-interface signals; and send the physical cell identifier and the status parameter to the user equipment.

The user equipment is configured to receive the physical cell identifier and the status parameter, sent by the base station of the current servicing small cell, of the base station of the non-servicing small cell, the status parameter being to indicate the mode in which the base station of the non-servicing small cell sends air-interface signals. The user equipment is further configured to determine time information according to which the base station of the non-servicing small cell sends the air-interface signals, according to the obtained air-interface timing, the physical cell identifier and the status parameter; and to detect the air-interface signals sent by the base station of the non-servicing small cell based on the time information, to discover the non-servicing small cell.

In the small cell discovery method and the system, the base station, the user equipment of the present disclosure, the base station of the current servicing small cell receives the physical cell identifier and the status parameter sent by the base station of the non-servicing small cell neighboring the current servicing small cell, and the status parameter is to indicate the mode in which the base station of the non-servicing small cell sends the air-interface signals, and the base station of the current servicing small cell sends the physical cell identifier and the status parameter to the UE, so that the UE can discover a small cell in an off state instantly.

BRIEF DESCRIPTION OF THE DRAWINGS

FIG. 1-1 is a schematic diagram of an LTE system according to embodiments of the present disclosure;

FIG. 1-2 is a flow chart of a small cell discovery method according to a first embodiment of the present disclosure;

FIG. 1-3 is a schematic diagram of a mode in which a base station shown in FIG. 1-1 sends air-interface signals, according to one embodiment of the present disclosure;

FIG. 1-4 is a schematic diagram of another LTE system according to embodiments of the present disclosure;

FIG. 1-5 is a schematic diagram of a mode in which a base station shown in FIG. 1-4 sends air-interface signals, according to one embodiment of the present disclosure;

FIG. 2 is a flow chart of a small cell discovery method according to a second embodiment of the present disclosure;

FIG. 3-1 is a first flow chart of a small cell discovery method according to a third embodiment of the present disclosure;

FIG. 3-2 is a second flow chart of a small cell discovery method according to the third embodiment of the present disclosure;

FIG. 3-3 is a flow chart of implementation of a step 305 according to the third embodiment of the present disclosure;

FIG. 4 is a schematic diagram of a base station according to a fourth embodiment of the present disclosure;

FIG. 5 is a schematic diagram of a base station according to a fifth embodiment of the present disclosure;

FIG. 6-1 is a first schematic diagram of a user equipment according to a sixth embodiment of the present disclosure;

FIG. 6-2 is a second schematic diagram of a user equipment according to the sixth embodiment of the present disclosure;

FIG. 6-3 is a schematic diagram of a third determination unit according to the sixth embodiment of the present disclosure;

FIG. 7-1 is a first schematic diagram of a small cell discovery system according to a seventh embodiment of the present disclosure;

FIG. 7-2 is a second schematic diagram of a small cell discovery system according to the seventh embodiment of the present disclosure;

FIG. 7-3 is a third configuration schematic diagram of a small cell discovery system according to the seventh embodiment of the present disclosure.

DETAILED DESCRIPTION

Figures 1, 2:
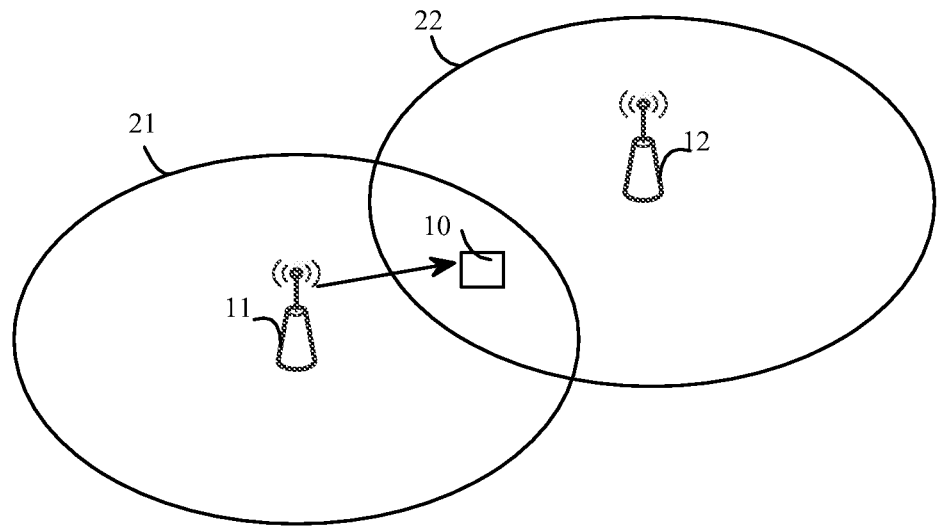

In view of the above technical problem existing in related art, a small cell in an off state can still send air-interface signals at certain time in various embodiments of the present disclosure, and the certain time are arranged in a certain time period or in a certain time slot. The small cell in the off state may be referred to as a "slept small cell" or a "dormant small cell" herein. As shown in FIG. 1-1, an enhanced node B (eNB) 11 is a base station of a serving small cell which is serving a UE 10, and an eNB 12 is a base station of a dormant small cell 22.

In some embodiments of the present disclosure, the eNB 12 can send some air-interface signals periodically, to facilitate the UE 10 to discover the dormant small cell 22 corresponding to the eNB 12 and to cause the UE 10 to measure a RSRP of the small cell 22. The technical solution provided by the embodiments of the present disclosure can both reduce a power consumption of one small cell and enhance a performance of discovering the small cell.

The technical solution of the present disclosure will be further described in detail hereinafter with respect the drawings and specific embodiments.

First Embodiment

The embodiment of the present disclosure provides a small cell discovery method applied to a base-station side. FIG. 1-2 is a flow chart of the small cell discovery method according to the embodiment of the present disclosure. As shown in FIG. 1-2, the method includes the following steps.

At Step 101, a base station of a current servicing small cell receives a physical cell identifier (PCI) and a status parameter sent by a base station of a non-servicing small cell neighboring the current servicing small cell.

Herein, the non-servicing small cell neighboring the current servicing small cell is the dormant small cell.

At Step 102, the base station of the current servicing small cell sends the PCI and the status parameter to a user equipment.

In the Step 101 of the present embodiment, the status parameter is to indicate a mode in which the base station of the non-servicing small cell sends air-interface signals.

Herein, the status parameter includes a period T1 at which the base station of the non-servicing small cell sends the air-interface signals, a duration T2 for which the base station of the non-servicing small cell sends the air-interface signals, an offset time of the non-servicing small cell, and a value X obtained after performing a remainder operation to the period T1 using a system frame number (SFN), i.e., X=SFN mod T1.

Figures 1, 2, 3:
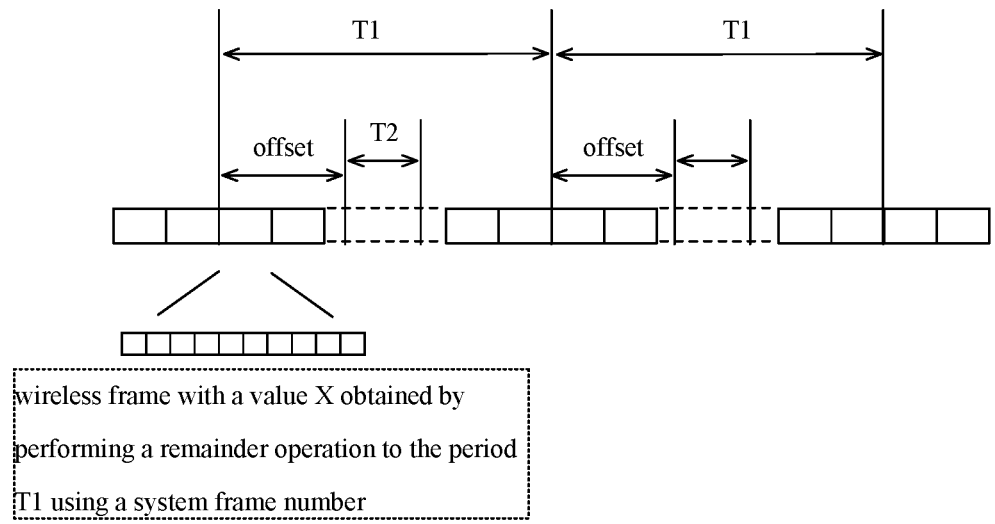

FIG. 1-3 is a schematic diagram of the mode in which the base station sends the air-interface signals in the embodiment of the present disclosure. As shown in FIG. 1-3, the above-mentioned status parameter may be sent in the mode of (X1, T1, T2, offset), where the dormant small cell employs the T1 as the period and takes the remainder X obtained by dividing the system frame number (SFN) by the period T1 as a start time of the period T1, and starts to send the air-interface signals at the time which is a sum of the start time X of the period T1 and the offset time, and a duration of sending the air-interface signals is T2. Of course, as an optional embodiment, the base station of the dormant small cell may send the air-interface signals only at some subframes or symbols within the duration T2. The air-interface signals may be at least any of such signals as a primary synchronization signal (PSS), a secondary synchronization signal (SSS), a common reference signal (CRS), a channel state information reference signal (CSI-RS) currently available. The air-interface signals may also be variations of these currently available signals. Further, those skilled in the art may also design some new signals as the air-interface signals based on relevant art, and these new signals may be used as cell discovery signals which are not repeated herein.

There may be a plurality of dormant small cells in neighboring areas of one serving small cell. As shown in FIG. 1-4, an eNB 11 is a base station of a serving small cell 21 which serves the UE 10, an eNB 12 is a base station of a dormant small cell 22, and an eNB 13 is a base station of a dormant small cell 23. This indicates that there is a plurality of dormant small cells neighboring the serving small cell 21. In this embodiment, the eNB 12 and the eNB 13 can send some air-interface signals periodically, to facilitate the UE 10 to discover the dormant small cell 22 corresponding to the eNB 12 and the dormant small cell 23 corresponding to the eNB 13 and to cause the UE 10 to measure the RSRPs of the small cells 22 and 23. The difference between FIG. 1-4 and FIG. 1-1 is that the dormant small cell 22 and the dormant small cell 23 need to be coordinated to configure different status parameters so that air-interface signals sent by different dormant small cells are staggered in time, thereby enhancing the performance that the UE 10 discovers the dormant small cells. As shown in FIG. 1-5, the period T2 which the base station 12 of the dormant small cell 22 sends the air-interface signals are staggered in time with the period T2 at which the base station 13 of the dormant small cell 23 sends the air-interface signals. Thus, the UE 10 can discovery the dormant small cell 22 and the dormant small cell 23 based on the status parameters.

In the embodiment of the present disclosure, the base station of the current servicing small cell receives the PCIs and the status parameters sent by the base stations of the non-servicing small cells neighboring the current servicing small cell, and the status parameters are used to indicate modes in which the base stations of the non-servicing small cells send air-interface signals, and the base station of the current servicing small cell sends the PCIs and the status parameters to the UE, so that the UE can discovery small cells in an off state instantly.

Second Embodiment

The embodiment of the present disclosure provides a small cell discovery method applied to a base-station side. FIG. 2 is a flow chart of a small cell discovery method of the second embodiment of the present disclosure. As shown in FIG. 2, the method includes following steps.

At Step 201, a base station of a current servicing small cell receives PCI and a status parameter sent by a base station of a non-servicing small cell neighboring the current servicing small cell.

Herein, the status parameter is to indicate a mode in which the base station of the non-servicing small cell sends air-interface signals;

At Step 202, the base station of the current servicing small cell sends the PCI and the status parameter to a user equipment;

At Step 203, the base station of the current servicing small cell receives the PCI and the RSRP of the non-servicing small cell satisfying a predetermined condition, sent by the UE;

At Step 204, the base station of the current servicing small cell determines one non-servicing small cell to be awaken, based on the PCI and the RSRP of the non-servicing small cell satisfying the predetermined condition; and At Step 205, the base station of the current servicing small cell hands the UE over to the awaken non-servicing small cell.

The status parameter in this embodiment include a period T1 at which the base station of the non-servicing small cell sends air-interface signals, a duration T2 in which the base station of the non-servicing small cell sends the air-interface signals, an offset time of the non-servicing small cell, and a value X obtained after performing a remainder operation to the period T1 using a system frame number (SFN), X=SFN mod T1.

In the embodiment of the present disclosure, the base station of the current servicing small cell receives the PCI and the RSRP of the non-servicing small cell satisfying the predetermined condition sent by the UE, and then determines the non-servicing small cell to be awaken, and further hands the UE over to the awaken non-servicing small cell. In this way, when the UE discovers that a signal quality of one small cell in an off state becomes better than that of the current servicing small cell, the UE can access the small cell in the off state having a better signal quality by implementing the present embodiment.

Third Embodiment

The embodiment of the present disclosure provides a small cell discovery method applied to a UE side. FIG. 3-1 is a first flow chart of the small cell discovery method of the third embodiment of the present disclosure. As shown in FIG. 3-1, the method includes following steps.

At Step 301, a UE receives a PCI and a status parameter, sent by a base station of a current servicing small cell, of a base station of a non-servicing small cell.

Herein, the status parameter is to indicate a mode in which the base station of the non-servicing small cell sends air-interface signals. The status parameter includes a period T1 at which the base station of the non-servicing small cell sends air-interface signals, a duration T2 in which the base station of the non-servicing small cell sends the air-interface signals, an offset time of the non-servicing small cell, and a value X obtained after performing a remainder operation to the T1 using the system frame number (SFN), X=SFN mod T1;

At Step 302, the UE determines time information according to which the base station of the non-servicing small cell sends the air-interface signals, based on obtained air-interface timing, the PCI and the status parameter.

At Step 303, the UE detects the air-interface signals sent by the base station of the non-servicing small cell based on the time information, to discover the non-servicing small cell.

At the Step 301 to Step 303, the UE can discover small cells in the off state, by receiving the PCIs and the status parameters and detecting the air-interface signals sent by the base stations of the non-servicing small cells.

Based on the embodiment shown in the above FIG. 3-1, as shown in FIG. 3-2, the method further includes following steps.

At Step 304, the UE measures RSRP of the non-servicing small cell.

At Step 305: the UE determines one non-servicing small cell satisfying a predetermined condition, based on the RSRP and the predetermined condition.

At Step 306, the UE sends, to the base station of the current servicing small cell, the PCI and the RSRP of the non-servicing small cell satisfying the predetermined condition.

In the embodiment of the present disclosure, the Step 305 may be implemented in two ways as follows.

As a first way, as shown in FIG. 3-3, the Step 305 includes following steps.

At Step 351, the UE judges whether the RSRP is larger than a predetermined first threshold.

At Step 352, if the RSRP is larger than the first threshold, the UE determines the non-servicing small cell having the RSRP larger than the first threshold as the non-servicing small cell satisfying the predetermined condition.

As a second way, the Step 304 includes: determining the non-servicing small cell having a RSRP satisfying $RSRP_{dormant} - RSRP_{serving} > RSRP_{threshold}$ as the non-servicing small cell satisfying the predetermined condition, where $RSRP_{dormant}$ is a measured strength value of the RSRP of the non-servicing small cell, and the $RSRP_{serving}$ is a measured strength value of the RSRP of the current servicing small cell, and the $RSRP_{threshold}$ is a second threshold.

The air-interface signals in this embodiment include at least one of the following signals: the primary synchronization signal (PSS), the secondary synchronization signal (SSS), the common reference signal (CRS), and the channel state information reference signal (CSI-RS).

In the technical solution provided in the above FIG. 3-2, the UE measures the RSRPs of the non-servicing small cells, determines the small cell having good signal qualities, and sends the PCI and the RSRP of the small cell having good signal qualities to the base station of the current servicing small cell, so that the base station can further control the UE to access the small cell having good signal qualities and in the off state.

Fourth Embodiment

Figures 1, 2, 3, 4:
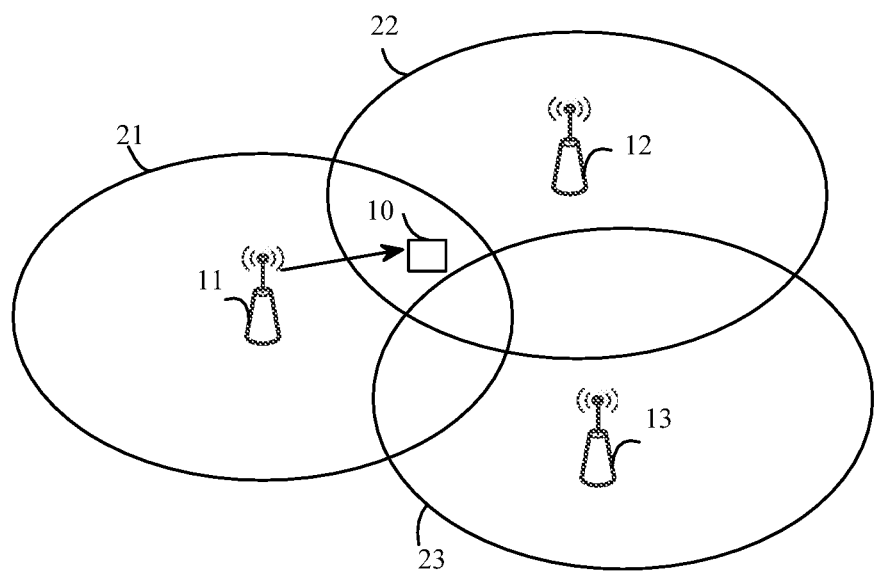
Figures 1, 3:
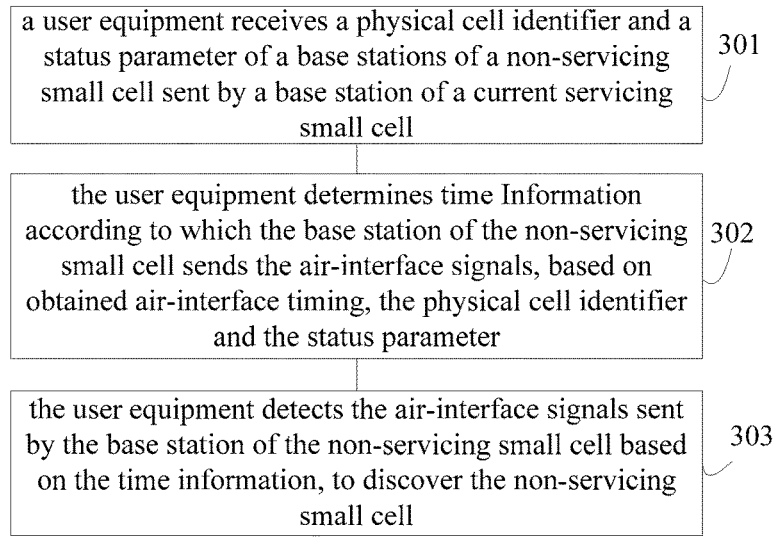
Figures 2, 3:
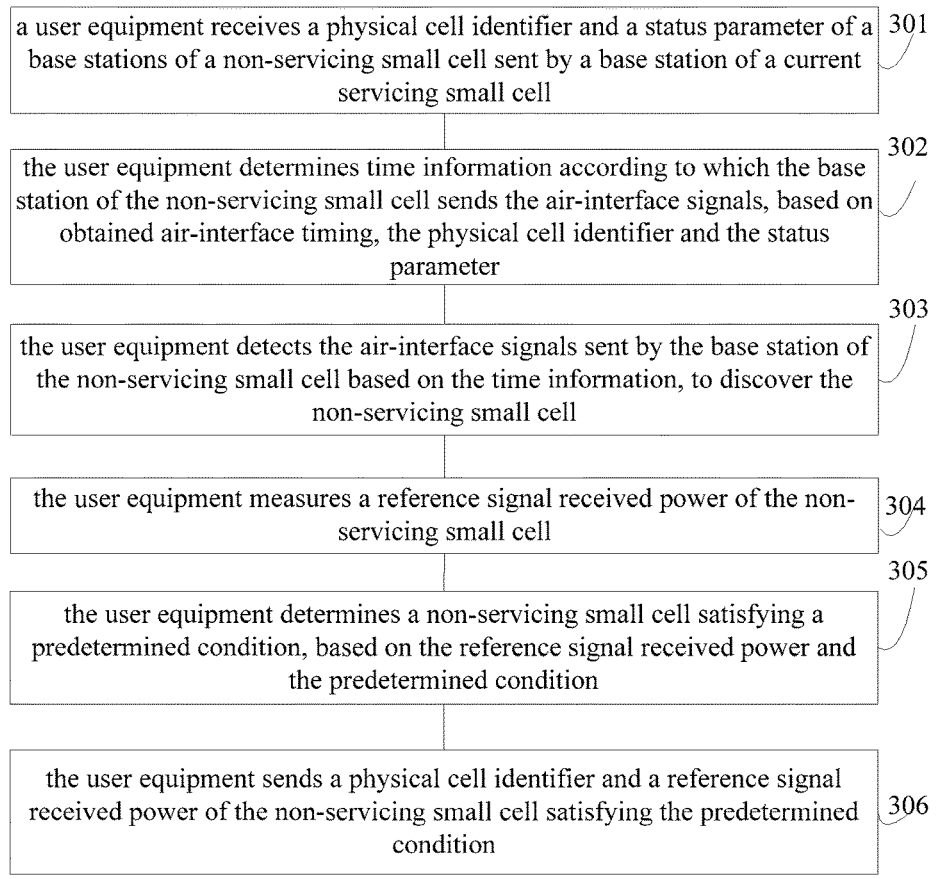
Figure 3:
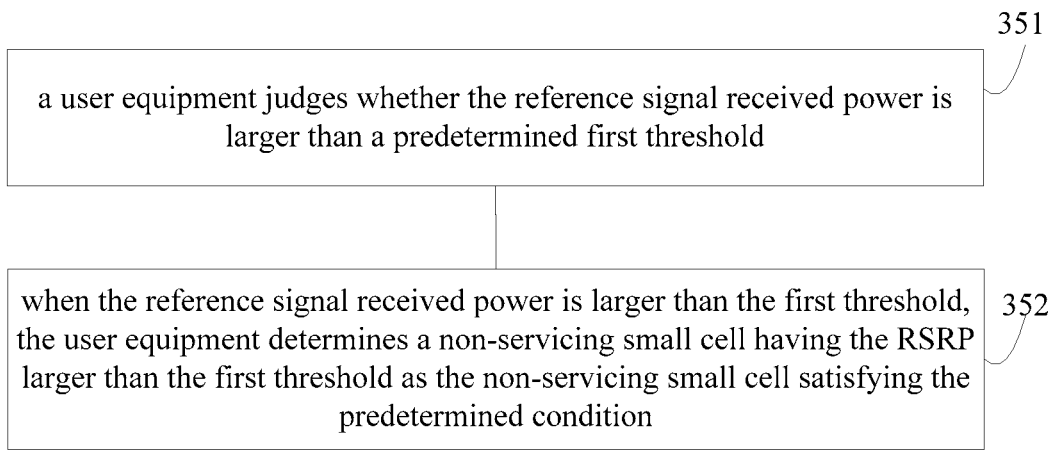
Figure 4:
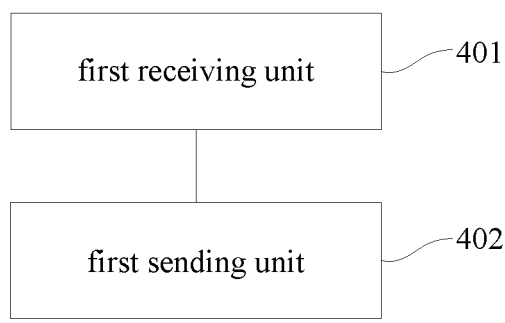

Based on the above first to third embodiments, the present disclosure provides a base station. FIG. 4 is a schematic diagram of a base station according to the fourth embodiment of the present disclosure. As shown in FIG. 4, the base station includes a first receiving unit 401 and a first sending unit 402.

The first receiving unit 401 is to receive a PCI and a status parameter sent by a base station of a non-servicing small cell neighboring a current servicing small cell. The status parameter is to indicate a mode in which the base station of the non-servicing small cell sends air-interface signals.

The first sending unit 402 is to send the PCI and the status parameter to the UE.

The status parameter in this embodiment includes a period T1 at which the base station of the non-servicing small cell sends air-interface signals, a duration T2 in which the base station of the non-servicing small cell sends the air-interface signals, an offset time of the non-servicing small cell, and a value X obtained after performing a remainder operation to the period T1 using the system frame number (SFN), i.e., X=SFN mod T1.

Fifth Embodiment

Figure 5:
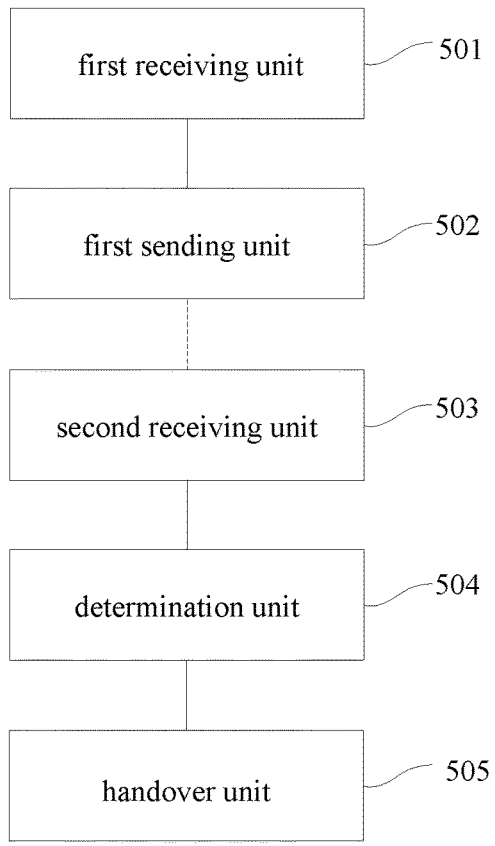

Based on the above first to fourth embodiments, the embodiment of the present disclosure provides a base station. FIG. 5 is a schematic diagram of the base station according to the fifth embodiment of the present disclosure. As shown in FIG. 5, the base station includes a first receiving unit 501, a first sending unit 502, a second receiving unit 503, a determination unit 504 and a handover unit 505.

The first receiving unit 501 is to receive a PCI and a status parameter sent by a base station of a non-servicing small cell neighboring a current servicing small cell. The status parameter is to indicate a mode in which the base station of the non-servicing small cell sends the air-interface signals.

The first sending unit 502 is to send the PCI and the status parameter to the UE.

The second receiving unit 503 is to receive the PCI and the RSRP, sent by the UE, of the non-servicing small cell satisfying a predetermined condition.

The first determination unit 504 is to determine the non-servicing small cell to be awaken, based on the RSRP of the non-servicing small cell satisfying the predetermined condition.

The handover unit 505 is to hand the UE over to the awaken non-servicing small cell.

The status parameter in this embodiment includes a period T1 at which the base station of the non-servicing small cell sends air-interface signals, a duration T2 in which the base station of the non-servicing small cell sends the air-interface signals, an offset time of the non-servicing small cell, and a value X obtained after performing a remainder operation to the period T1 using the system frame number (SFN), i.e., X=SFN mod T1.

Sixth Embodiment

Figures 1, 6:
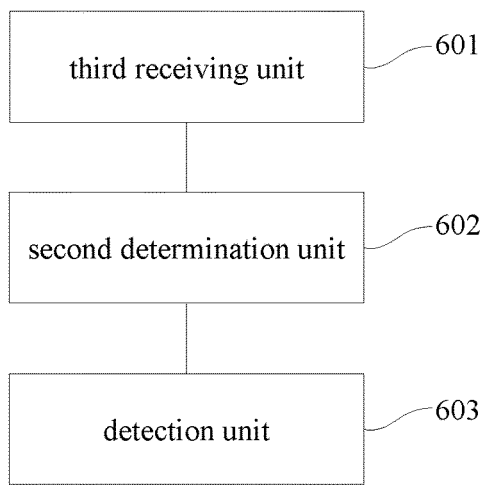
Figures 2, 6:
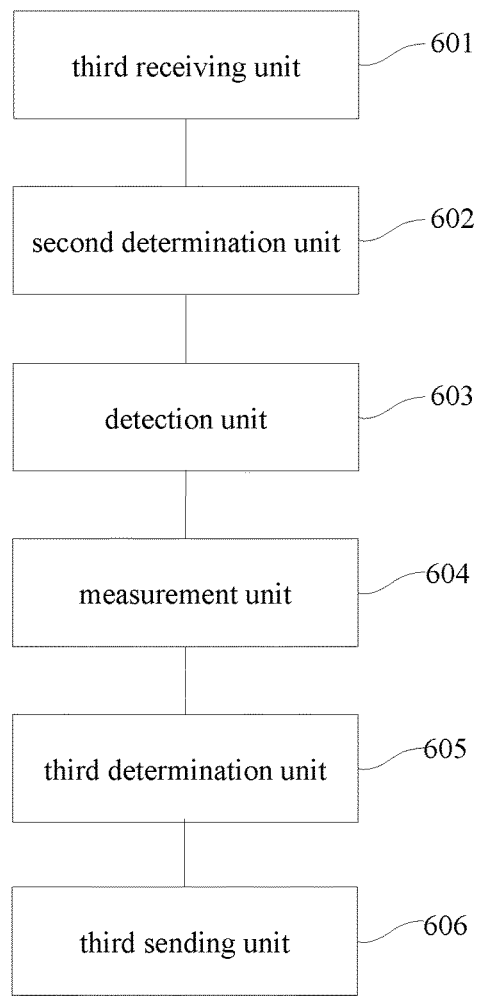
Figures 3, 6:
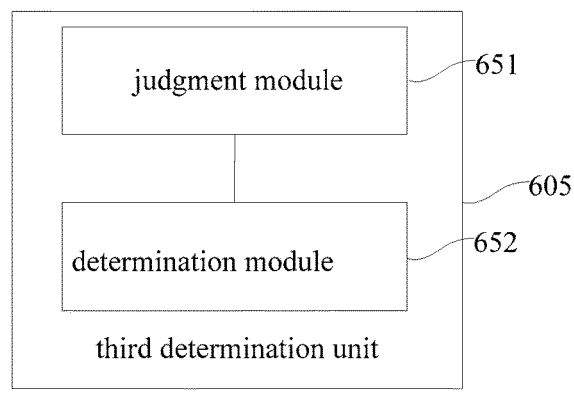

Based on the above fifth embodiment, the embodiment of the present disclosure provides a user equipment (UE). FIG. 6-1 is a first schematic diagram of the user equipment according to the sixth embodiment of the present disclosure. As shown in FIG. 6-1, the user equipment includes a third receiving unit 601, a second determination unit 602 and a detection unit 603.

The third receiving unit 601 is to receive a PCI and a status parameter, sent by a base station of a current servicing small cell, of a non-servicing small cell. The status parameter is to indicate a mode in which the base station of the non-servicing small cell sends air-interface signals.

The second determination unit 602 is to determine time information according to which the base station of the non-servicing small cell sends the air-interface signals, based on the obtained air-interface timing, the PCI and the status parameter.

The detection unit 603 is to detect the air-interface signals sent by the base station of the non-servicing small cell based on the time information, to discover the non-servicing small cell.

Based on the embodiment shown in the above FIG. 6-1, as shown in FIG. 6-2, the user equipment further includes a measurement unit 604, a third determination unit 605, and a third sending unit 606.

The measuring unit 604 is used to measure a RSRP of the non-servicing small cell.

The third determination unit 605 is to determine a non-servicing small cell satisfying a predetermined condition, based on the RSRP and the predetermined condition.

The third sending unit 606 is to send, to the base station of the current servicing small cell, the PCI and the RSRP of the non-servicing small cell satisfying the predetermined condition.

The embodiment of the present disclosure provides two ways for implementing the third determination unit 605, the first of which is that the third determination unit is specifically to determine one non-servicing small cell having a RSRP satisfying $RSRP_{dormant} - RSRP_{serving} > RSRP_{threshold}$ as the non-servicing small cell satisfying the predetermined condition, where, the $RSRP_{dormant}$ is a measured strength value of the RSRP of the non-servicing small cell, the $RSRP_{serving}$ is a measured strength value of the RSRP of the current servicing small cell, and the $RSRP_{threshold}$ is a second threshold.

The second way is that, as shown in FIG. 6-3, the third determination unit 605 includes a judgment module 651 and a determination module 652.

The judgment module 651 is to judge whether the RSRP is larger than a predetermined first threshold.

The determination module 652 is to, when the RSRP is larger than the first threshold, determine the non-servicing small cell having the RSRP larger than the first threshold as the non-servicing small cell satisfying the predetermined condition.

The air-interface signals in this embodiment include at least one of the primary synchronization signal (PSS), the secondary synchronization signal (SSS), the common reference signal (CRS), and the channel state information reference signal (CSI-RS).

Seventh Embodiment

Figures 1, 7:
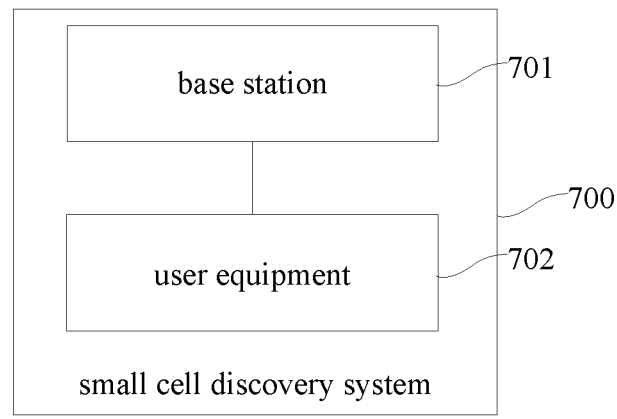
Figures 2, 7:
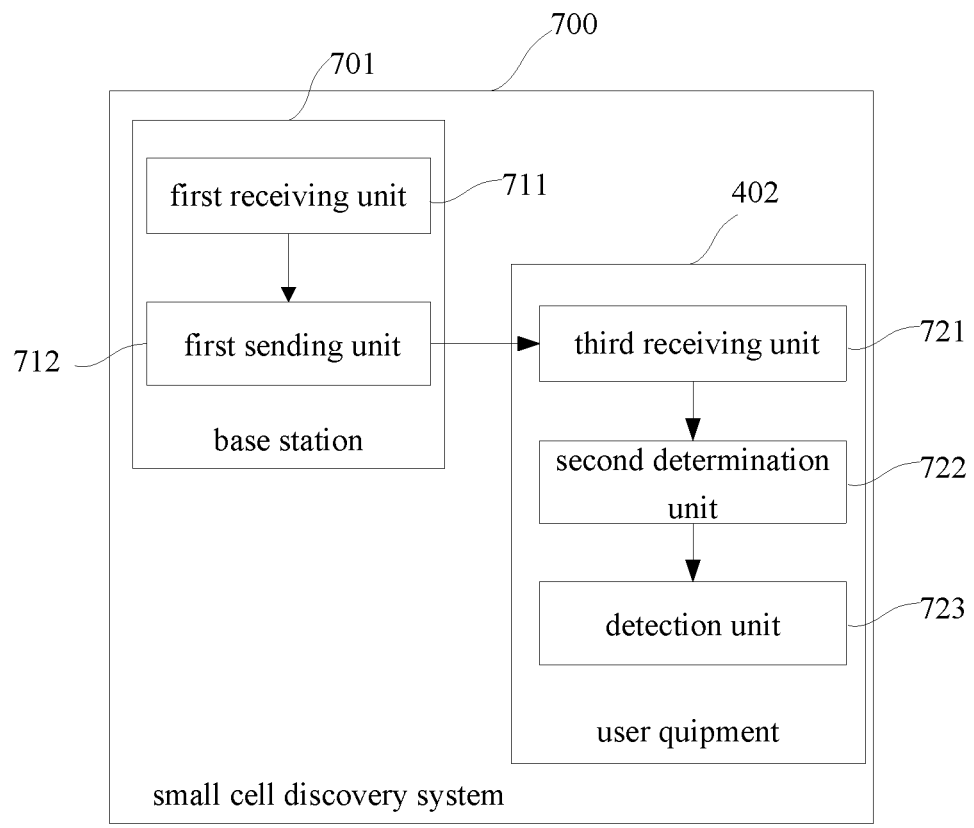
Figures 3, 7:
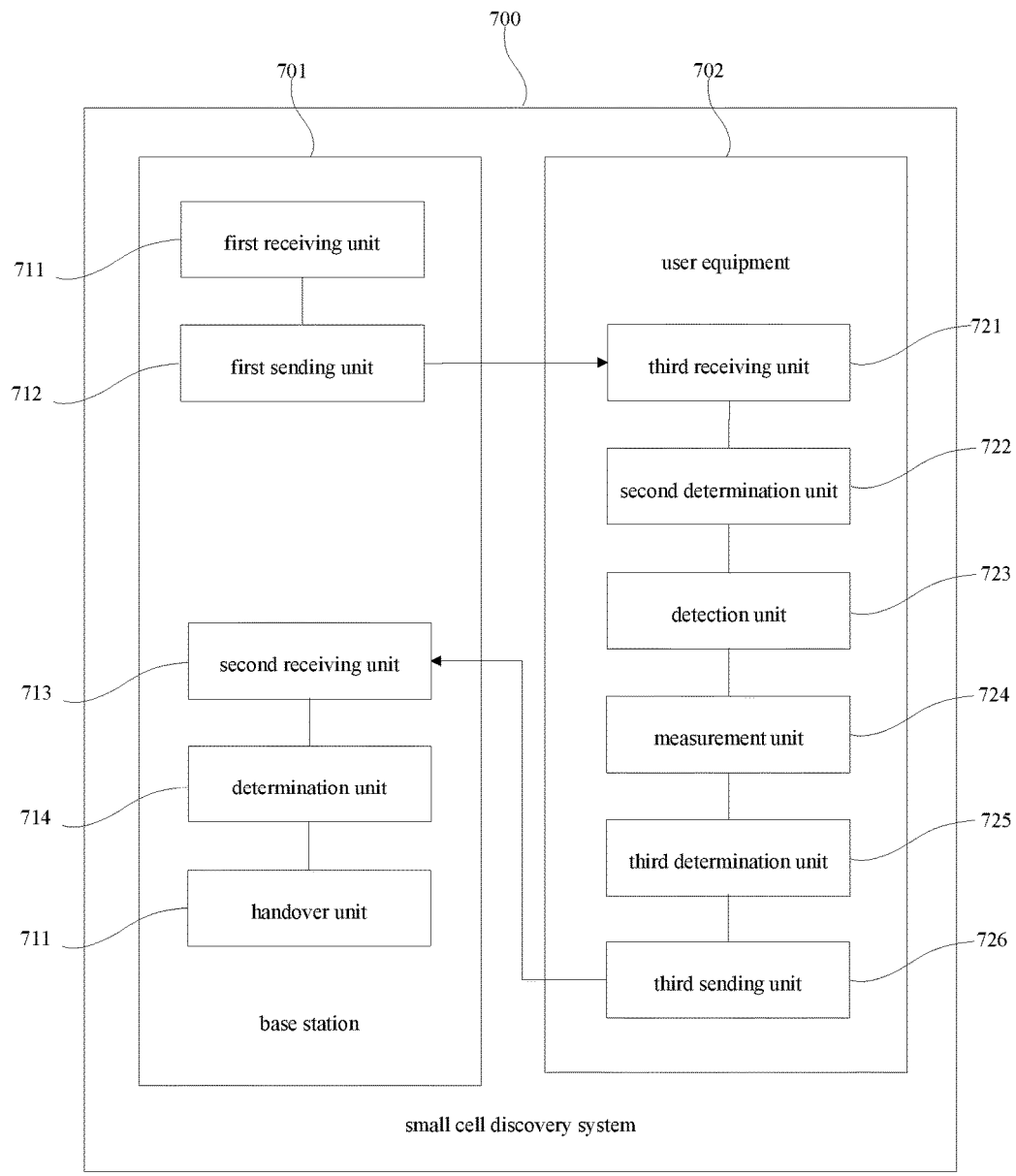

Based on the above fourth to sixth embodiments, the embodiment of the present disclosure also provides a small cell discovery system. FIG. 7-1 is a schematic diagram of the small cell discovery system of the seventh embodiment of the present disclosure. As shown in FIG. 7-1, the small cell discovery system 700 includes a base station 701 and a user equipment 702.

The base station 701 is to receive a PCI and a status parameter sent by a base station of a non-servicing small cell neighboring a current servicing small cell. The status parameter is to indicate a mode in which the base station of the non-servicing small cell sends air-interface signals. The base station 701 is further to send the PCI and the status parameter to the UE.

The user equipment 702 is to receive the PCI and the status parameter, sent by the base station of the current servicing small cell, of the base station of the non-servicing small cell. The status parameter is to indicate the mode in which the base station of the non-servicing small cell sends air-interface signals. The user equipment 702 is further to determine time information according to which the base station of the non-servicing small cell sends the air-interface signals, based on the obtained air-interface timing, the PCI and the status parameter. The user equipment 702 is to detect the air-interface signals sent by the base station of the non-servicing small cell based on the time information, to discover the non-servicing small cells.

Based on the above embodiment shown in FIG. 7-1, as shown in FIG. 7-2, the base station 701 further includes a first receiving unit 711 and a first sending unit 712. The user equipment 702 further includes a third receiving unit 721, a second determination unit 722, and a detection unit 723.

The first receiving unit 711 is to receive the PCI and the status parameter sent by the base station of the non-servicing small cell neighboring the current servicing small cell. The status parameter is to indicate the mode in which the base station of the non-servicing small cell sends air-interface signals.

The first sending unit 712 is to send the PCI and the status parameter to the UE.

The third receiving unit 721 is to receive the PCI and the status parameter, sent by the base station of the current servicing small cell, of the non-servicing small cell. The status parameter is to indicate the mode in which the base station of the non-servicing small cell sends the air-interface signals.

The second determination unit 722 is to determine time information according to which the base station of the non-servicing small cell sends the air-interface signals, based on the obtained air-interface timing, the PCI and the status parameter.

The detection unit 723 is to detect the air-interface signals sent by the base station of the non-servicing small cell based on the time information, to discover the non-servicing small cell.

Based on the above embodiment shown in FIG. 7-2, as shown in FIG. 7-3, the base station 701 further includes a second receiving unit 713, a determination unit 714, and a handover unit 715. The User Equipment 702 further includes a measurement unit, a third determination unit, and a third sending unit.

The second receiving unit 713 is to receive the PCI and the RSRP, sent by the UE, of the non-servicing small cell satisfying the predetermined condition.

The first determination unit 714 is to determine the non-servicing small cell to be awaken, based on the RSRP of the non-servicing small cell satisfying the predetermined condition.

The handover unit 715 is to hand the UE over to the awaken non-servicing small cell.

The measuring unit 724 is to measure the RSRP of the non-servicing small cell.

The third determination unit 725 is to determine the non-servicing small cell satisfying the predetermined condition, based on the RSRP and the predetermined condition.

The third sending unit 726 is to send, to the base station of the current servicing small cell, the PCI and the RSRP of the non-servicing small cell satisfying the predetermined condition.

Eighth Embodiment

Figure 8:
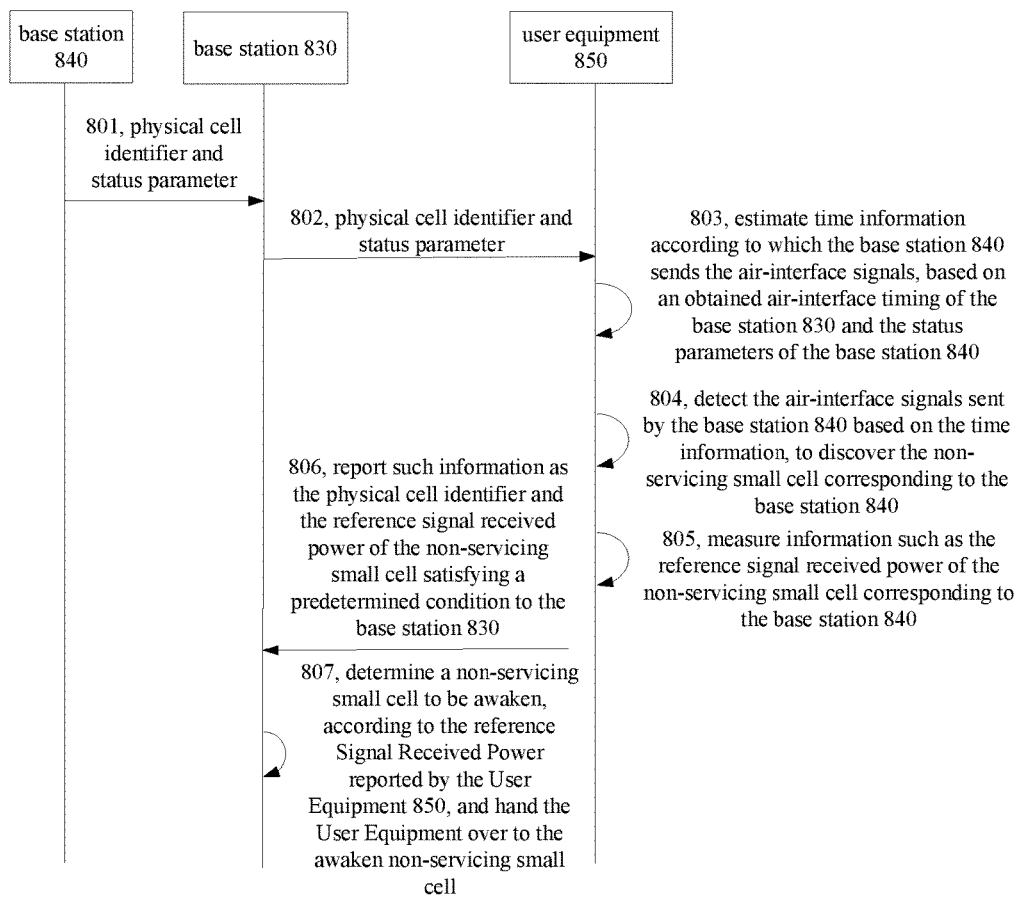
FIG. 8 is a flow diagram of a small cell discovery method according to an eighth embodiment of the present disclosure.

The embodiment of the present disclosure provides a flow chart of a small cell discovery method. FIG. 8 is the flowchart of the small cell discovery method of the eighth embodiment of the present disclosure. As shown in FIG. 8, the method is applied to the small cell discovery system which includes a base station 830 of a current servicing small cell, a base station 840 of a non-servicing small cell neighboring the current servicing small cell, and a user equipment 850. As shown in FIG. 8, the method includes following steps.

At Step 801, the base station 840 send a PCI and a status parameter to the base station 830.

At Step 802, the base station 830 sends the PCI and the status parameter to the UE 850.

Herein, the status parameter is to indicate a mode in which the base station of the non-servicing small cell sends air-interface signals.

At Step 803, the UE 850 estimates time information according to which the base station 840 sends the air-interface signals, based on an obtained air-interface timing of the base station 830 and the status parameter of the base station 840.

At Step 804, the UE 850 detects the air-interface signals sent by the base station 840 based on the time information, to discover the non-servicing small cell corresponding to the base station 840.

Herein, the Step 804 may further include detecting the air-interface signals sent by the base station 840 and synchronizing with the base station 840.

At Step 805, the UE 850 measures information such as the RSRP of the non-servicing small cell corresponding to the base station 840.

At Step 806, the UE 850 reports such information as the PCI and the RSRP of the non-servicing small cell satisfying a predetermined condition to the base station 830.

At Step 807, the base station 830 determines the non-servicing small cell to be awaken, according to the RSRP reported by the UE 850, and hands the UE over to the awaken non-servicing small cell.

Ninth Embodiment

The small cell discovery method provided by the embodiment of the present disclosure will be explained hereinafter in combination with some specific numeral values. Referring again to FIG. 1-4, the method includes the following steps.

At Step A1, the eNB 12 of the dormant small cell 22 sends its PCI and status parameter (X, T1, T2, offset)=(0, 200, 10, 50) to the eNB 11 of the serving small cell 21.

At Step A2, the eNB 13 of the dormant small cell 23 sends its PCI and status parameter (X, T1, T2, offset)=(0, 200, 10, 70) to the eNB 11 of the serving small cell 21.

The Step A1 and the Step A2 are not related with each other in sequence.

At Step A3, the eNB 11 sends the PCI and the status parameter (0, 200, 10, 50) of the eNB 12 to the UE 10, and the eNB 11 sends the PCI and the status parameter (0, 200, 10, 70) of the eNB 13 to the UE 10.

At Step A4, the UE 10 estimates that start time at which the eNB 12 sends the air-interface signals are SFN=50, 250, 450, . . . , and a duration in which the eNB 12 sends the air-interface signals is ten radio frames, according to the air-interface timing of eNB 11 and the status parameter (0, 200, 10, 50) of the eNB 12. Thus, the UE 10 starts to detect the air-interface signals sent by the eNB 12 and synchronizes with the eNB 12 prior to the SFN=50, 250, 450, . . . of the serving small cell 21, and then measures information such as the RSRP of the dormant small cell 22.

Similarly, the UE 10 estimates that start time at which the eNB 13 sends the air-interface signals are SFN=70, 270, 470, . . . , and a duration in which the eNB 13 sends the air-interface signals is ten radio frames, according to the air-interface timing of eNB 11 and the status parameter (0, 200, 10, 70) of the eNB 13. Thus, the UE 10 starts to detect the air-interface signals sent by the eNB 13 and synchronizes with the eNB 13 prior to the corresponding time, and then measures information such as the RSRP of the dormant small cell 23.

At Step A5, the UE 10 reports, to the eNB 11 of the servicing Cell 21, information such as the PCI and the RSRP of the dormant small cell satisfying the predetermined condition.

For example, the UE determines, by measurement, that the dormant small cell 22 satisfies the predetermined condition, but the dormant small cell 23 does not satisfy the predetermined condition, then the UE 10 reports information such as the PCI and the RSRP of the dormant small cell 22 to the eNB 11.

The predetermined condition in the present embodiment may be configured at a network side, such as at the base station side, and transferred to the UE. The predetermined condition may be, for example, $RSRP_{dormant} - RSRP_{serving} > X_{threshold}$ in the above embodiment.

At Step A6, the eNB 11 determines to awake the dormant small cell 22 according to the information reported by the UE 10, and hands the UE over to the dormant small cell 22.

It should be understood that, in the several embodiments provided in the present disclosure, the disclosed device and method may be implemented in other ways. The apparatus embodiments described above are only illustrative. For example, division of units may be only a division according to logical functions. There may be other divisions in actual implementations, e.g., a plurality of units and components may be combined or integrated in another system, or some features may be omitted or not executed. Additionally, couplings, or direct couplings, or communication connections between displayed or discussed components may be via some interfaces, and indirect couplings or communication connections between devices or units may be electrical, mechanical or other forms of connections.

The units illustrated above as discrete components may be or may be not physically separate, the components displayed as units may be or may be not physical units, and may be located in one site and be distributed among multiple network units. Apart or whole of the units may be selected according to actual requirements to achieve the purposes of the technical solutions of the embodiments.

Additionally, the functional units in various embodiments of the present disclosure may be all integrated in one processing unit, or each of the units may be a separate unit, or two or more of the units may be integrated in one unit. The integrated units may be implemented by using hardware or by using hardware and software functional units.

One skilled in the art may be understood that, a part or whole of the embodiments of the above method may be implemented by hardware related to programs and instructions. The above programs may be stored in a computer readable storage medium. The programs may, when executed, to perform the steps in the embodiments of the above method. The above storage medium may include various medium capable of storing programs and codes, such as a removable storage device, a read only memory (ROM), a random access memory (RAM), a magnetic disk or a compact disk.

Optionally, the above integrated units of the present disclosure may be stored in a computer readable storage medium if they are implemented in forms of software functional modules or are sold or used as separate products. Based on such understandings, the essentials of technical solutions of the embodiments of the present disclosure or the parts that the present disclosure contributes to relevant techniques may be bodied in computer software products. The computer software products are stored in a storage medium including instructions for causing a computing device (which may be a personal computer, a server, a network device or the like) to perform some or parts of the method of the embodiments of the present disclosure. The above storage medium may include various medium capable of storing programs and codes such as a removable storage device, a ROM, a RAM, a magnetic disk or a compact disk.

The above description is only specific embodiments of the present disclosure. However, the protection scope of the present disclosure is not limited thereto. Any variations or replacements anticipated by those skilled in the art in the technical scope disclosed by the present disclosure will fall into the protection scope of the present disclosure. Thus, the protection scope of the present disclosure should be determined by the claims.

What is claimed is:

1. A small cell discovery method, comprising:
receiving, by a base station of a current servicing small cell, a first physical cell identifier and a first status parameter sent by a first base station of a first non-servicing small cell neighboring the current servicing small cell, the first status parameter being configured to indicate a first mode in which the first base station of the first non-servicing small cell sends air-interface signals;
receiving, by the base station of the current servicing small cell, a second physical cell identifier and a second status parameter sent by a second base station of a second non-servicing small cell neighboring the current servicing small cell, the second status parameter being configured to indicate a second mode in which the second base station of the second non-servicing small cell sends air-interface signals; and sending, by the base station of the current servicing small cell, the first physical cell identifier, the first status parameter, the second physical cell identifier and the second status parameter to a user equipment;

wherein the first non-servicing small cell and the second non-servicing small cell are coordinated to configure the first status parameter and the second status parameter to be different form each other so that the air-interface signals sent by the first non-servicing small cell and the air-interface signals sent by the second non-servicing small cell are staggered in time.

2. The method according to claim 1, further comprising:

receiving, by the base station of the current servicing small cell, a physical cell identity and a reference signal received power sent by the user equipment, of one non-servicing small cell satisfying a predetermined condition;

determining, by the base station of the current servicing small cell, based on the reference signal received power of the one non-servicing small cell satisfying the predetermined condition, the one non-servicing small cell satisfying the predetermined condition to be awaken; and handing, by the base station of the current servicing small cell, the user equipment over to the awaken non-servicing small cell satisfying the predetermined condition;

wherein the one non-servicing small cell satisfying a predetermined condition is one of the first non-servicing small cell and the second non-servicing small cell.

3. The method according to claim 1, wherein the first status parameter comprises a first period at which the first base station of the first non-servicing small cell sends air-interface signals, a first duration in which the first base station of the first non-servicing small cell sends the air-interface signals, a first offset time of the first non-servicing small cell, and a first value obtained after performing a remainder operation to the first period using a system frame number;

wherein the second status parameter comprises a second period at which the second base station of the second non-servicing small cell sends air-interface signals, a second duration in which the second base station of the second non-servicing small cell sends the air-interface signals, a second offset time of the second non-servicing small cell, and a second value obtained after performing a remainder operation to the second period using the system frame number;

wherein the first period at which the first base station of the first non-servicing small cell sends air-interface signals is staggered in time with the second period at which the second base station of the second non-servicing small cell sends the air-interface signals sends the air-interface signals.

4. A small cell discovery method, comprising:

receiving, by a user equipment, a first physical cell identifier and a first status parameter of a first base station of a first non-servicing small cell as well as a second physical cell identifier and a second status parameter of a second base station of a second non-servicing small cell, sent by a base station of a current servicing small cell, the first status parameter being configured to indicate a first mode in which the first base station of the first non-servicing small cell sends air-interface signals, the second status parameter being configured to indicate a second mode in which the second base station of the second non-servicing small cell sends air-interface signals;

determining, by the user equipment, first time information according to which the first base station of the first non-servicing small cell sends the air-interface signals, according to obtained air-interface timing, the first physical cell identifier and the first status parameter; and determining, by the user equipment, second time information according to which the second base station of the second non-servicing small cell sends the air-interface signals, according to obtained air-interface timing, the second physical cell identifier and the second status parameter;

detecting, by the user equipment based on the first time information, the air-interface signals sent by the first base station of the first non-servicing small cell, thereby discovering the first non-servicing small cell; and detecting, by the user equipment based on the second time information, the air-interface signals sent by the second base station of the second non-servicing small cell, thereby discovering the second non-servicing small cell;

wherein the first non-servicing small cell and the second non-servicing small cell are coordinated to configure the first status parameter and the second status parameter to be different form each other so that the air-interface signals sent by the first non-servicing small cell and the air-interface signals sent by the second non-servicing small cell are staggered in time.

5. The method according to claim 4, further comprising:

measuring, by the user equipment, a first reference signal received power of the first non-servicing small cell and a second reference signal received power of the second non-servicing small cell;

determining, by the user equipment, based on the first reference signal received power, the second reference signal received power and a predetermined condition, one of the first non-servicing small cell and the second non-servicing small cell as one non-servicing small cell satisfying the predetermined condition; and sending, by the user equipment, the physical cell identifier and the reference signal received power of the one non-servicing small cell satisfying the predetermined condition to the base station of the current servicing small cell.

6. The method according to claim 5, wherein determining, by the user equipment, based on the first reference signal received power, the second reference signal received power and the predetermined condition comprises:

judging, by the user equipment, whether the first reference signal received power is larger than a predetermined first threshold, and whether the second reference signal received power is larger than the predetermined first threshold; and when the first reference signal received power is larger than the first threshold, determining the first non-servicing small cell having the first reference signal received power larger than the first threshold as one non-servicing small cell satisfying the predetermined condition; and when the second reference signal received power is larger than the first threshold, determining the second non-servicing small cell having the second reference signal received power larger than the first threshold as one non-servicing small cell satisfying the predetermined condition.

7. The method according to claim 5, wherein determining, by the user equipment, based on the first reference signal received power, the second reference signal received power and the predetermined condition, comprises:

determining the one non-servicing small cell having a reference signal received power (RSRP) satisfying $RSRP_{dormant} - RSRP_{serving} > RSRP_{threshold}$ as the non-servicing small cell satisfying the predetermined condition, where $RSRP_{dormant}$ is a measured strength value of the reference signal received power of the non-servicing small cell, $RSRP_{serving}$ is a measured strength value of the reference signal received power of the current servicing small cell, and $RSRP_{threshold}$ is a second threshold;

wherein the one non-servicing small cell having the reference signal received power (RSRP) satisfying $RSRP_{dormant} - RSRP_{serving} > RSRP_{threshold}$ is the one of the first non-servicing small cell and the second non-servicing small cell.

8. The method according to claim 4, wherein the air-interface signals comprise at least one of:

a primary synchronization signal, a secondary synchronization signal, a common reference signal, and a channel state information reference signal.

9. A communication apparatus, comprising:

a memory; and a processor configured to read a program stored in the memory, to: process a first physical cell identifier and a first status parameter of a first base station of a first non-servicing small cell neighboring a current servicing small cell, and process a second physical cell identifier and a second status parameter of a second base station of a second non-servicing small cell neighboring the current servicing small cell;

wherein the first status parameter is to indicate a first mode in which the first base station of the first non-servicing small cell sends air-interface signals; and the second status parameter is to indicate a second mode in which the second base station of the second non-servicing small cell sends air-interface signals;

wherein the first non-servicing small cell and the second non-servicing small cell are coordinated to configure the first status parameter and the second status parameter to be different form each other so that the air-interface signals sent by the first non-servicing small cell and the air-interface signals sent by the second non-servicing small cell are staggered in time.

10. The communication apparatus according to claim 9, wherein the communication apparatus is a base station; the processor is further configured to:

receive the first physical cell identifier and the first status parameter sent by the first base station of the first non-servicing small cell neighboring the current servicing small cell as well as the second physical cell identifier and the second status parameter sent by the second base station of the second non-servicing small cell neighboring the current servicing small cell; and send the first physical cell identifier, the first status parameter, the second physical cell identifier and the second status parameter to a user equipment.

11. The communication apparatus according to claim 10, wherein the processor is further configured to:

receive a physical cell identifier and a reference signal received power of one non-servicing small cell satisfying a predetermined condition, sent by the user equipment;

based on the reference signal received power of the one non-servicing small cell satisfying the predetermined condition, determine the one non-servicing small cell satisfying the predetermined condition to be awaken; and hand the user equipment over to the awaken non-servicing small cell satisfying the predetermined condition;

wherein the one non-servicing small cell satisfying a predetermined condition is one of the first non-servicing small cell and the second non-servicing small cell.

12. The communication apparatus according to claim 9, wherein the first status parameter comprises a first period at which the first base station of the first non-servicing small cell sends air-interface signals, a first duration in which the first base station of the first non-servicing small cell sends the air-interface signals, a first offset time of the first non-servicing small cell, and a first value obtained after performing a remainder operation to the first period using a system frame number;

wherein the second status parameter comprises a second period at which the second base station of the second non-servicing small cell sends air-interface signals, a second duration in which the second base station of the second non-servicing small cell sends the air-interface signals, a second offset time of the second non-servicing small cell, and a second value obtained after performing a remainder operation to the second period using the system frame number;

wherein the first period at which the first base station of the first non-servicing small cell sends air-interface signals is staggered in time with the second period at which the second base station of the second non-servicing small cell sends the air-interface signals sends the air-interface signals.

13. The communication apparatus according to claim 9, wherein the communication apparatus is a user equipment; wherein the processor is further configured to:

receive the first physical cell identifier and the first status parameter of the first base station of the first non-servicing small cell as well as the second physical cell identifier and the second status parameter of the second base station of the second non-servicing small cell, sent by the base station of the current servicing small cell;

determine first time information according to which the first base station of the first non-servicing small cell sends the air-interface signals, based on obtained air-interface timing, the first physical cell identifier and the first status parameter; and determine second time information according to which the second base station of the second non-servicing small cell sends the air-interface signals, according to obtained air-interface timing, the second physical cell identifier and the second status parameter;

detect the air-interface signals sent by the first base station of the first non-servicing small cell based on the first time information, to discover the first non-servicing small cell and detect the air-interface signals sent by the second base station of the second non-servicing small cell based on the second time information, to discover the second non-servicing small cell.

14. The communication apparatus according to claim 13, wherein the processor is further configured to:

measure a first reference signal received power of the first non-servicing small cell and a second reference signal received power of the second non-servicing small cell;

based on the first reference signal received power the second reference signal received power and a predetermined condition, determine one of the first non-servicing small cell and the second non-servicing small cell as one non-servicing small cell satisfying the predetermined condition; and send a physical cell identifier and a reference signal received power of the one non-servicing small cell satisfying the predetermined condition to the base station of the current servicing small cell.

15. The communication apparatus according to claim 14, wherein the processor is configured to:

judge whether the first reference signal received power is larger than a predetermined first threshold, and whether the second reference signal received power is larger than the predetermined first threshold; and when the first reference signal received power is larger than the first threshold, determine the first non-servicing small cell having the first reference signal received power larger than the first threshold as the one non-servicing small cell satisfying the predetermined condition; and when the second reference signal received power is larger than the first threshold, determine the second non-servicing small cell having the second reference signal received power larger than the first threshold as the one non-servicing small cell satisfying the predetermined condition.

16. The communication apparatus according to claim 14, wherein the processor is further configured to determine the one non-servicing small cell having the reference signal received power satisfying $RSRP_{dormant} - RSRP_{serving} > RSRP_{threshold}$ as the non-servicing small cell satisfying the predetermined condition, wherein $RSRP_{dormant}$ is a measured strength value of the reference signal received power of the non-servicing small cell, $RSRP_{serving}$ is a measured strength value of the reference signal received power of the current servicing small cell, and $RSRP_{threshold}$ is a second threshold;

wherein the one non-servicing small cell having the reference signal received power (RSRP) satisfying $RSRP_{dormant} - RSRP_{serving} > RSRP_{threshold}$ is the one of the first non-servicing small cell and the second non-servicing small cell.

17. The communication apparatus according to claim 13, wherein the air-interface signals comprise at least one of:

a primary synchronization signal, a secondary synchronization signal, a common reference signal, and a channel state information reference signal.

* * * * *